(12) United States Patent
Luo et al.

(10) Patent No.: US 12,334,960 B2
(45) Date of Patent: Jun. 17, 2025

(54) CONFIGURABLE RADIO FREQUENCY (RF) MULTIPLEXING SWITCH FOR RF FRONT END IN 4G/5G APPLICATIONS

(71) Applicant: Avago Technologies International Sales Pte. Limited, Singapore (SG)

(72) Inventors: Yuan Luo, Los Gatos, CA (US); Yalin Jin, San Jose, CA (US); Shang Wang, Milpitas, CA (US); Jeesu Kim, San Ramon, CA (US)

(73) Assignee: Avago Technologies International Sales Pte. Limited, Palo Alto, CA (US)

( * ) Notice: Subject to any disclaimer, the term of this patent is extended or adjusted under 35 U.S.C. 154(b) by 319 days.

(21) Appl. No.: 17/872,912

(22) Filed: Jul. 25, 2022

(65) Prior Publication Data
US 2024/0030944 A1  Jan. 25, 2024

(51) Int. Cl.
H04B 1/00 (2006.01)
H04B 1/04 (2006.01)
H04B 1/30 (2006.01)

(52) U.S. Cl.
CPC .......... *H04B 1/0057* (2013.01); *H04B 1/006* (2013.01); *H04B 1/04* (2013.01); *H04B 1/30* (2013.01);
(Continued)

(58) Field of Classification Search
CPC .............. H04W 56/005; H04W 56/00; H04W 72/1268; H04W 74/0833; H04W 74/0841; H04W 74/0866; H04W 74/08; H04W 72/12; H04W 4/06; H04W 76/40; G01S 13/003; G01S 13/765; G01S 13/767; G01S 13/87; G01S 13/00; G01S 13/76; G01S 5/02; H04L 43/0864; H04L 1/0003; H04L 1/0009; H04L 1/0026; H04L 1/1816; H04L 1/1822; H04L 1/1861; H04L 12/1868; H04L 2001/0093; H04L 5/0055;
(Continued)

(56) References Cited

U.S. PATENT DOCUMENTS 7,251,499 B2  7/2007 Ellä et al.
8,385,876 B2  2/2013 Goto et al.
(Continued)

FOREIGN PATENT DOCUMENTS

JP      2011166663 A      8/2011
WO    WO-2022056150 A1 *  3/2022  ............. H03F 1/565

*Primary Examiner* — Nathan S Taylor
(74) *Attorney, Agent, or Firm* — Quarles & Brady LLP

(57) ABSTRACT

An RF multiplexing switching circuit for an RF front end (e.g., for a mobile communications device transmitting/receiving in the RF region) includes a set of RF inputs and a set of RF outputs outputting to RF filters, the RF inputs and outputs connected by signal paths. The switching circuit includes series switches for creating conducting signal paths for transmitting/receiving RF signals between the RF inputs and outputs, and a set of common shared shunt switches (e.g., for M RF inputs and N RF outputs, M+X shunt switches, where X<N) collectively capable (e.g., in conjunction with the series switches) of pulling to ground potential any RF input and output not on the conducting signal path. The RF switching circuit may be implemented as a band select switch (e.g., where the inputs connect to power amplifiers) or an antenna switch (e.g., where the inputs connect to device antennas).

20 Claims, 7 Drawing Sheets

(52) U.S. Cl.
CPC ............... *H04B 2001/0408* (2013.01); *H04B 2001/307* (2013.01)

(58) Field of Classification Search
CPC ........... H04L 1/18; H04L 5/00; H04B 1/0057; H04B 1/006; H04B 1/04; H04B 1/30; H04B 2001/0408; H04B 2001/307; H04B 1/00; H04B 1/16; H04B 1/40; H04B 1/401
See application file for complete search history.

(56) References Cited

U.S. PATENT DOCUMENTS

| | | | |
|---|---|---|---|
| 8,401,496 B2 | 3/2013 | Goto et al. | |
| 8,546,980 B2 | 10/2013 | Shimamoto et al. | |
| 8,923,777 B2 | 12/2014 | Nezhad-Ahmadi et al. | |
| 8,983,407 B2* | 3/2015 | Southcombe | H03F 1/30 455/114.2 |
| 9,008,597 B2* | 4/2015 | Levesque | H03F 1/0261 455/127.1 |
| 9,030,256 B2* | 5/2015 | Jones | H03F 1/0277 330/251 |
| 9,048,787 B2* | 6/2015 | Jones | H03F 3/245 |
| 9,077,405 B2* | 7/2015 | Jones | H03F 1/0227 |
| 9,300,286 B2 | 3/2016 | Gaynor et al. | |
| 9,553,550 B2* | 1/2017 | Puliafico | H03F 3/195 |
| 9,577,590 B2* | 2/2017 | Levesque | H03F 3/21 |
| 9,866,261 B2 | 1/2018 | Laurila | |
| 9,900,204 B2* | 2/2018 | Levesque | H03F 3/195 |
| 10,075,160 B2 | 9/2018 | Oshita et al. | |
| 10,326,501 B2 | 6/2019 | Sugar et al. | |
| 10,848,187 B2 | 11/2020 | Thompson et al. | |
| 10,886,911 B2* | 1/2021 | Willard | H03K 17/6874 |
| 11,038,543 B2 | 6/2021 | Chang et al. | |
| 11,296,734 B2 | 4/2022 | Anthony et al. | |
| 2015/0349770 A1* | 12/2015 | Bakalski | H03K 17/161 327/382 |
| 2016/0093948 A1 | 3/2016 | Lehtola | |
| 2018/0048273 A1* | 2/2018 | Goldblatt | H03F 3/213 |
| 2020/0112300 A1* | 4/2020 | Balteanu | H03K 19/018521 |
| 2020/0235760 A1 | 7/2020 | Nakajima | |
| 2021/0194511 A1 | 6/2021 | Chang et al. | |
| 2021/0336588 A1* | 10/2021 | Ranta | H03F 3/213 |
| 2021/0351811 A1* | 11/2021 | Vedula | H03K 17/102 |
| 2021/0409077 A1* | 12/2021 | Ruby | H03H 9/568 |
| 2022/0014221 A1* | 1/2022 | Jiang | H03K 5/08 |
| 2022/0393650 A1* | 12/2022 | Ayranci | H03F 1/223 |
| 2023/0231586 A1* | 7/2023 | Hua | H03F 1/26 455/552.1 |
| 2023/0327693 A1* | 10/2023 | Tripurari Jayaraman | H03F 1/347 455/552.1 |
| 2023/0421104 A1* | 12/2023 | Schr?gendorfer | H03F 1/523 |

\* cited by examiner

CONFIGURABLE RADIO FREQUENCY (RF) MULTIPLEXING SWITCH FOR RF FRONT END IN 4G/5G APPLICATIONS

FIELD OF THE INVENTION

Embodiments of the inventive concepts disclosed herein are directed generally toward radio frequency (RF) front end modules for 4G/5G applications, and more generally to multiplexing switches for RF front end modules.

BACKGROUND

In advanced smart phone radio frequency (RF) circuitries, multi-pole multi-throw RF switches are critical blocks in a complex RF front end (RFFE) module connecting the transceiver and antennas. For example, most second- or third-generation (2G, 3G) wireless mobile communications devices operate within the RF region of the electromagnetic spectrum at 850 or 1900 MHz; fourth-generation (4G) devices and applications may include additional frequencies below 6 GHz; and fifth-generation (5G) devices and applications may include even higher frequencies in the 30-300 GHz range. RF front end modules may include power amplifiers (PA), RF signal filters, low noise amplifiers (LNA), and RF switches integrated into small factor printed circuit boards (PCB) using advanced 3D packaging techniques. Multiplexing switches between the PAs/LNAs and RF filters may conduct transmitting (Tx) and received (Rx) RF signals within different frequency bands defined by the filters. Multiple Power Amplifiers (PA), RF filters, Low Noise Amplifiers (LNA) and RF switches are integrated into a smaller factor of Printed Circuit Board (PCB) using advanced 3D package techniques. Multiplexing switches between the PAs/LNAs (or antennas) and the RF filters serve to conduct different frequency bands defined by the filters, providing low insertion loss through conducting channels and high isolation when shutting off the undesired or unconnected channels.

As 4G and 5G RF channels and applications proliferate (and expand into higher frequency ranges, as noted above) integrating more complex Tx/Rx switch functioning and antenna loads must be balanced with reducing die size for a limited PCB area. Further, increased RF switch throws may create power matching difficulties due to higher capacitance, which in turn may degrade RF performance at higher frequencies or broader bandwidths.

Traditional RF switch structure incorporates multiple series-shunt pairs. For example, a series switch may connect a channel, or block signal leakage when the channel is unconnected; a complementary shunt switch may provide low impedance grounding and high isolation when the channel is unconnected. However, this structure is associated with several disadvantages. An RF switch with multiple dedicated series/shunt switch pairs may be overdesigned, wherein redundant shunt switches may occupy die size (and increase operating cost) unnecessarily. This in turn complicates the design challenge of fitting increasingly complex RF switch dies into increasingly compact RF modules, and limits the RF signal routing space in the PCB. Each shunt switch on a signal path introduces additional loaded off-capacitance ($C_{off}$), which makes power matching (and thus achieving broader bandwidths and/or higher frequencies) more difficult.

Further, when the RF switch is an antenna switch (ASW), and the limited number of antennas on the phone control board are shared by various frequency bands and RF modules via the RF filters, the stand-by ASW antenna pin (e.g., via which the ASW is connected to one or more antennas) may easily pick up signal leakage from other active modules, generating reverse harmonics which cause consistency issues either as spurious emissions or de-sense blockers.

SUMMARY

In a first aspect, a radio frequency (RF) multiplexing switching circuit for an RF front end (e.g., for 4G/5G applications and/or mobile communications devices) is disclosed. In embodiments, the RF switching circuit includes a set of RF inputs and a set of RF outputs, the RF inputs and outputs connected by RF signal paths. An RF signal path may be a conducting signal path when any switches in the RF signal path close to allow transit of RF signals between the input and output and through the RF switch. Each RF output is connected to RF filters (for filtering of transmitting or received RF signals passing through the RF front end, e.g., between a transceiver and an antenna of the mobile communications device). The RF switching circuit includes series switches at or adjacent to the RF outputs for creating (e.g., by closing, or switching on) a conducting signal path based on a signal path between an RF input and an RF output (e.g., via which an RF signal may travel). The RF switching circuit also includes a set of common (e.g., shared) shunt switches; for example, a set of M+X shunt switches, where M is the number of RF inputs, N is the number of RF outputs, and X is less than N (e.g., a dedicated shunt switch may be placed at or adjacent to each RF input, but not at each RF output). For example, when a series switch closes (e.g., activates, turns "on") to create a conducting signal path from an RF input to an RF output (the other series switches remaining open (e.g., turned "off") to block signal leakage through the other RF outputs), the set of shunt switches collectively operate (e.g., in conjunction with selected series switches) to pull to ground potential each unconnected RF input and RF output.

In some embodiments, the set of RF inputs includes a first RF input connected to each RF output by an RF signal path, and a set of RF inputs connected to each RF output by an RF signal path except for an RF output connected only to the first RF input.

In some embodiments, the set of shunt switches includes a shunt switch at the first RF input and additional shunt switches at each RF input.

In some embodiments, the switching circuit is a band select switch, wherein each RF input is connected to an RF amplifier and each RF filter connected to the RF outputs is associated with a particular RF frequency band.

In some embodiments, the RF switching circuit is an antenna switch, wherein each RF input is connected to an RF antenna.

In some embodiments, the antenna switch is configurable in an isolation mode by closing each series switch and shunt switch.

In some embodiments, the set of series switches includes: a first series switch that closes to create the conducting signal path based on an RF signal path between a first RF input and a first RF output; a set of second series switches at the first RF output, which isolate the first RF output from the other RF inputs by opening; a set of third series switches at or adjacent to the other RF outputs (e.g., those RF outputs not on the conducting signal path, but connected to the first RF input by signal paths) that open to isolate their adjacent RF outputs from the first RF input and from the conducting signal path; and a set of fourth series switches at or adjacent to other RF outputs (e.g., those RF outputs not on the conducting signal path and unknot connected to the first RF output by signal paths), which close to create low impedance paths from their adjacent RF outputs to RF ground points of the RF switching circuit (e.g., the ground points allowing pull-down of electrical potential to ground level for the RF outputs).

In some embodiments, the set of shunt switches includes a first shunt switch adjacent to the first RF input (e.g., the RF input on the conducting signal path) and configured to isolate the conducting signal path from the RF ground by opening, while the remaining shunt switches close in conjunction with the series switches to create low impedance paths to RF ground points for the RF inputs and RF outputs not on the conducting signal path (e.g., the ground points allowing pull-down of electrical potential to ground level for the RF inputs and outputs).

In some embodiments, the switching circuit is an RF front-end circuit for a mobile communications device.

In some embodiments, the switching circuit is a switching circuit with two RF inputs, four RF outputs, three shunt switches, and seven series switches.

In a further aspect, a mobile communications device having an RF front end is also disclosed. In embodiments, the mobile communications device includes at least one transceiver, at least one antenna, and an RF front end connecting the transceivers and antennas (e.g., connecting either the transceivers or the antennas to RF filters configured for filtering of transmitted or received RF signals within selected frequency bands). For example, the RF front end includes one or more RF switching circuits, each switching circuit including a set of RF inputs and a set of RF outputs, the RF inputs and outputs connected by RF signal paths. Each RF output is connected to RF filters (for filtering of transmitting or received RF signals passing through the RF front end, e.g., between a transceiver and an antenna of the mobile communications device). The RF switching circuit includes series switches at or adjacent to the RF outputs for creating (e.g., by closing, or switching on) a conducting signal path based on a signal path between an RF input and an RF output (e.g., via which an RF signal may travel). The RF switching circuit also includes a set of common (e.g., shared) shunt switches (e.g., a shunt switch at each RF input and an additional shunt switch at an RF output). For example, when a series switch closes (e.g., activates, turns "on") to create a conducting signal path from an RF input to an RF output (the other series switches remaining open (e.g., turned "off") to block signal leakage through the other RF outputs), the set of shunt switches collectively operate (e.g., in conjunction with selected series switches) to pull to ground potential each unconnected RF input and RF output.

In a still further aspect, a method for configurable RF multiplexing is disclosed. In embodiments, the method includes creating a conducting signal path (e.g., via which RF signals may travel) based on an RF signal path between an RF input and RF output of an RF switching circuit having a set of RF inputs and RF outputs. The method includes isolating the RF output on the conducting signal path from the remaining RF inputs (e.g., to which the RF output is coupled by an RF signal path) by opening the other series switches at the RF output. The method includes isolating those RF outputs other than the RF output on the conducting signal path (e.g., and also coupled to the RF input on the conducting signal path by RF signal paths) by opening the series switches at the RF outputs. The method includes isolating the RF input on the conducting signal path from the RF ground points of the switching circuit by opening a shunt switch at the RF input. The method includes creating low impedance paths to the RF ground points from 1) each RF input not on the conducting signal path and 2) each RF output that is both a) not on the conducting signal path and b) not coupled to the RF input on the conducting signal path by an RF signal path by closing both the remaining shunt switches and the series switches adjacent to the RF output ports.

It is to be understood that both the foregoing general description and the following detailed description are exemplary and explanatory only and should not restrict the scope of the claims. The accompanying drawings, which are incorporated in and constitute a part of the specification, illustrate exemplary embodiments of the inventive concepts disclosed herein and together with the general description, serve to explain the principles.

BRIEF DESCRIPTION OF THE DRAWINGS

The detailed description is described with reference to the accompanying figures. The use of the same reference numbers in different instances in the description and the figures may indicate similar or identical items. Various embodiments or examples ("examples") of the present disclosure are disclosed in the following detailed description and the accompanying drawings. The drawings are not necessarily to scale. In general, operations of disclosed processes may be performed in an arbitrary order, unless otherwise provided in the claims. In the drawings:

DETAILED DESCRIPTION

Figure 1:
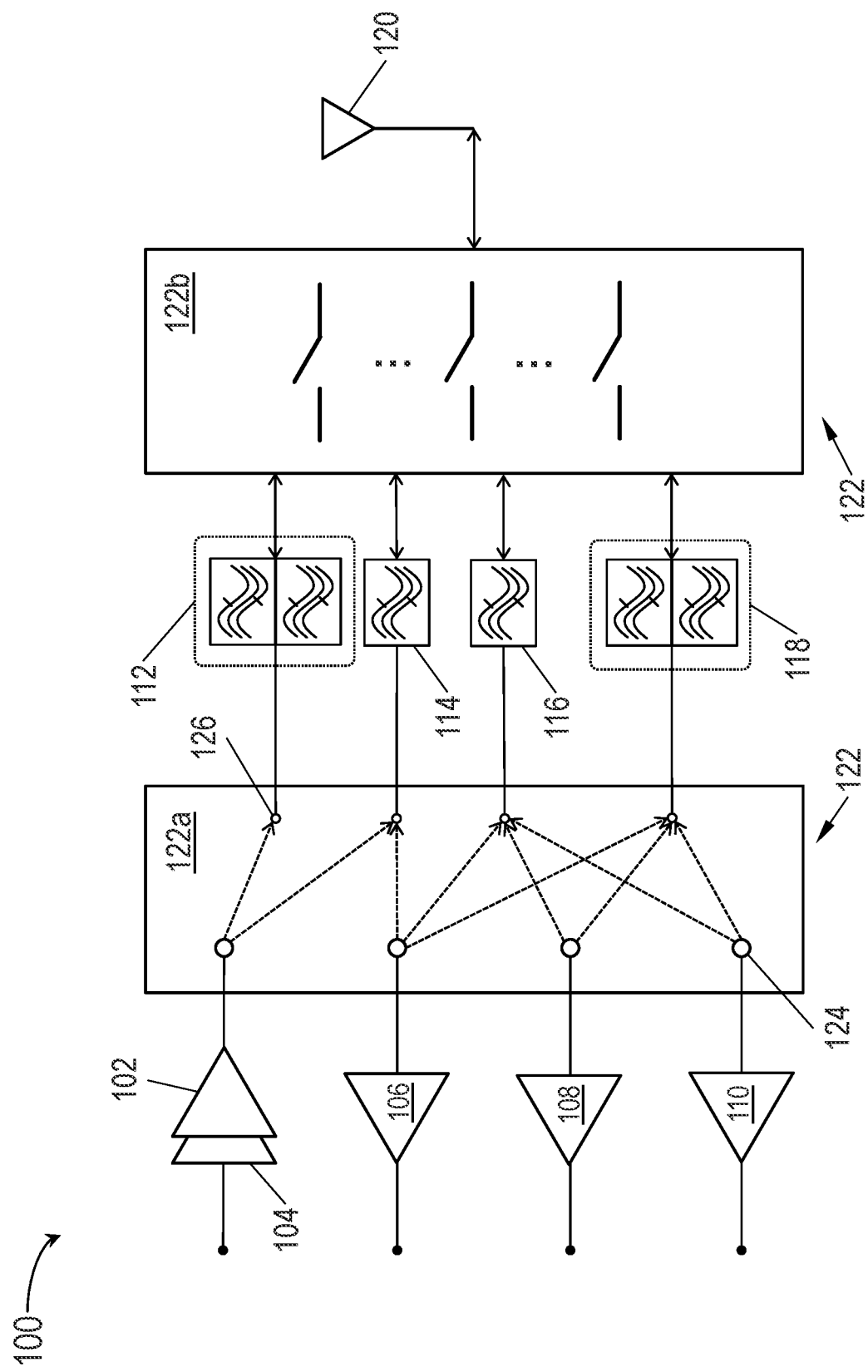
FIG. 1 is a block diagram illustrating an RF front-end module according to example embodiments of this disclosure.

Before explaining one or more embodiments of the disclosure in detail, it is to be understood that the embodiments are not limited in their application to the details of construction and the arrangement of the components or steps or methodologies set forth in the following description or illustrated in the drawings. In the following detailed description of embodiments, numerous specific details may be set forth in order to provide a more thorough understanding of the disclosure. However, it will be apparent to one of ordinary skill in the art having the benefit of the instant disclosure that the embodiments disclosed herein may be practiced without some of these specific details. In other instances, well-known features may not be described in detail to avoid unnecessarily complicating the instant disclosure.

As used herein a letter following a reference numeral is intended to reference an embodiment of the feature or element that may be similar, but not necessarily identical, to a previously described element or feature bearing the same reference numeral (e.g., 1, 1a, 1b). Such shorthand notations are used for purposes of convenience only and should not be construed to limit the disclosure in any way unless expressly stated to the contrary.

Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of "a" or "an" may be employed to describe elements and components of embodiments disclosed herein. This is done merely for convenience and "a" and "an" are intended to include "one" or "at least one," and the singular also includes the plural unless it is obvious that it is meant otherwise.

Finally, as used herein any reference to "one embodiment" or "some embodiments" means that a particular element, feature, structure, or characteristic described in connection with the embodiment is included in at least one embodiment disclosed herein. The appearances of the phrase "in some embodiments" in various places in the specification are not necessarily all referring to the same embodiment, and embodiments may include one or more of the features expressly described or inherently present herein, or any combination or sub-combination of two or more such features, along with any other features which may not necessarily be expressly described or inherently present in the instant disclosure.

Broadly speaking, embodiments of the inventive concepts disclosed herein are directed to a configurable RF multiplexing switch for an RF front end, e.g., for 4G/5G applications and/or mobile communications devices. By minimizing the number of required shunt switches, the configurable RF switch reduces complexity and switch die size while enhancing RF performance. In particular, reverse harmonic effects associated with conventional antenna switch (ASW) circuitry may be significantly reduced.

A "switch" as used herein may include one or more transistors arranged to operate in a closed state (e.g., activated, turned "on") or an open state (e.g., deactivated, turned "off") with respect to an input node and an output node, where an operational state of the switch may be controlled by a drive signal. For example, a switch operating in an open state (e.g., a non-conducting state) may restrict or eliminate current flow between the input node and the output node, whereas a switch operating in a closed state (e.g., a conducting state) may allow current flow between the input node and the output node.

Further, an "RF signal path" or "signal path" as used herein may refer to any path (e.g., wired link, physical link) between an electrically coupled RF input port and RF output port, via which RF signals may transit through an RF circuit. For example, an RF signal path may include intervening elements between the RF input port and RF output port, similarly, in some embodiments, an RF signal may undergo or experience variance and/or processing while in transit via the RF signal path. It may be noted that not every RF input port and RF output port within an RF circuit may be operatively coupled by an RF signal path. Similarly, while an RF signal path may be configured for transit of RF signals between an RF input port and an RF output port, the RF signal path may not always be capable doing so. For example, an RF signal path may include one or more series switches disposed in the RF signal path, e.g., between the RF input port and the RF output port. When in a closed (e.g., conducting) state, a series switch can create a conducting signal path based on an RF signal path, the conducting signal path allowing RF signals to transit between the RF input port and the RF output port and thereby through the RF circuit. When in an open (e.g., non-conducting) state, the series switch may restrict the transit of RF signals between its input and output nodes as described above. Accordingly, an RF signal path incorporating a series switch in the open state may be a non-conducting signal path.

Referring to FIG. 1, a radio frequency (RF) front end 100 is shown. For example, an RF front end (RFFE) may refer generally to a circuit or assembly of circuits between a receiver antenna input (e.g., of a mobile communications device) and a mixer or modem stage, the RF front end generally including (but not limited to) RF transceivers, power amplifiers (PA), low noise amplifiers (LNA), and/or antenna tuners.

In embodiments, the RF front end 100 may be implemented in a smartphone or other like mobile communications device and may include power amplifiers 102, 104 (PA); low noise amplifiers 106, 108, 110; RF filters 112, 114, 116, 118; RF antennas 120 (e.g., antenna elements); and RF multiplexing switches 122, wherein an RF multiplexing switch may be implemented as a band select switch 122a (BSW) or as an antenna switch 122b (ASW). For example, a band select switch 122a may receive RF input (e.g., via RF input ports 124) from RF amplifiers (e.g., PA 102, 104; LNA 106, 108, 110) and produce RF output (e.g., via RF output ports 126) to the RF filters 112, 114, 116, 118. Similarly, an antenna switch 122b may receive RF input from the RF antennas 120 and produce RF output for the RF filters 112, 114, 116, 118. In embodiments, the RF front end 100 (e.g., front-end module) may be implemented as a circuit or system of connected circuits within the mobile communications device.

Figure 2A:
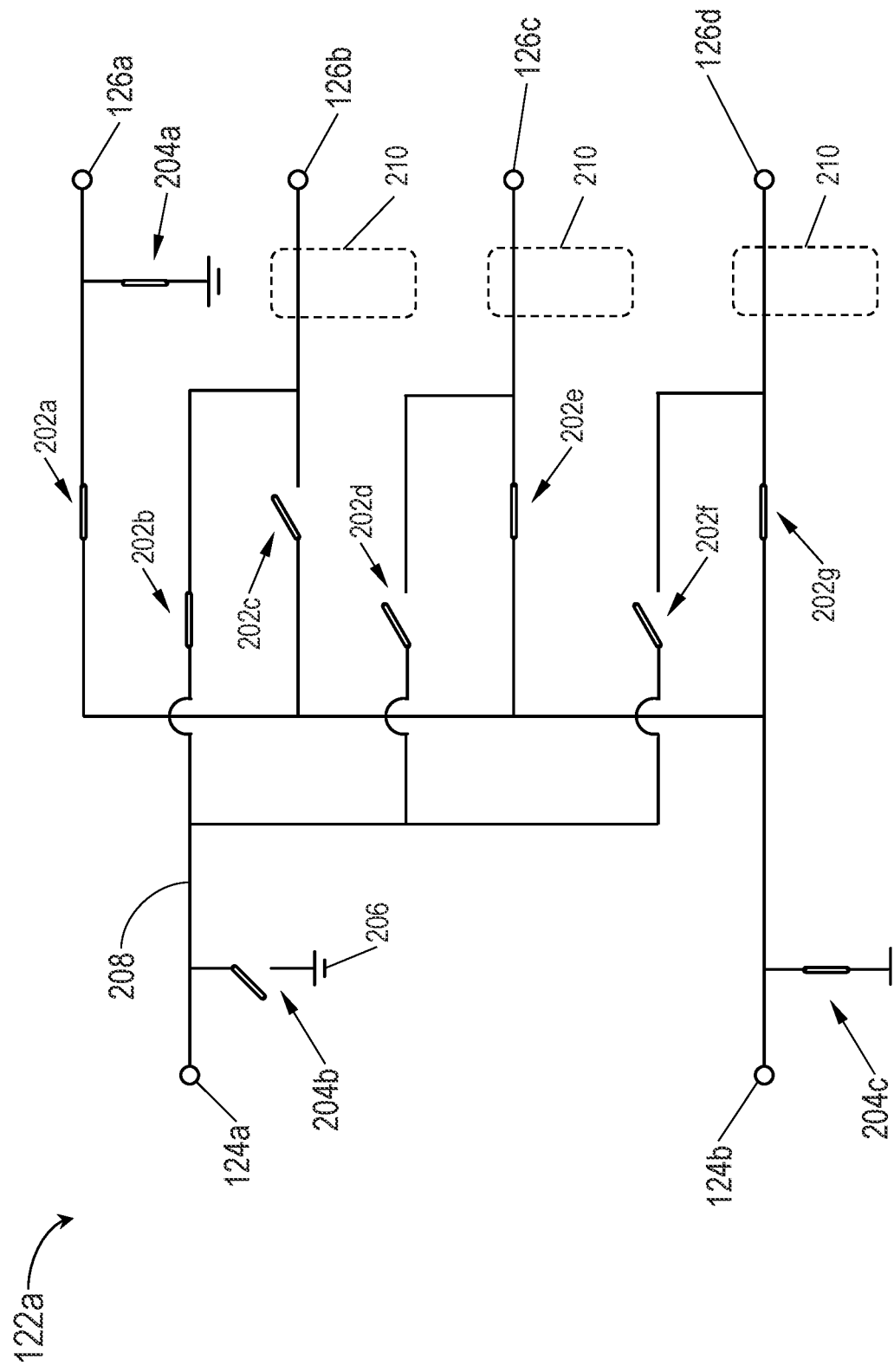
FIG. 2A is a block diagram illustrating an RF band select multiplexing switch of the RF front-end module of FIG. 1.
Figure 4:
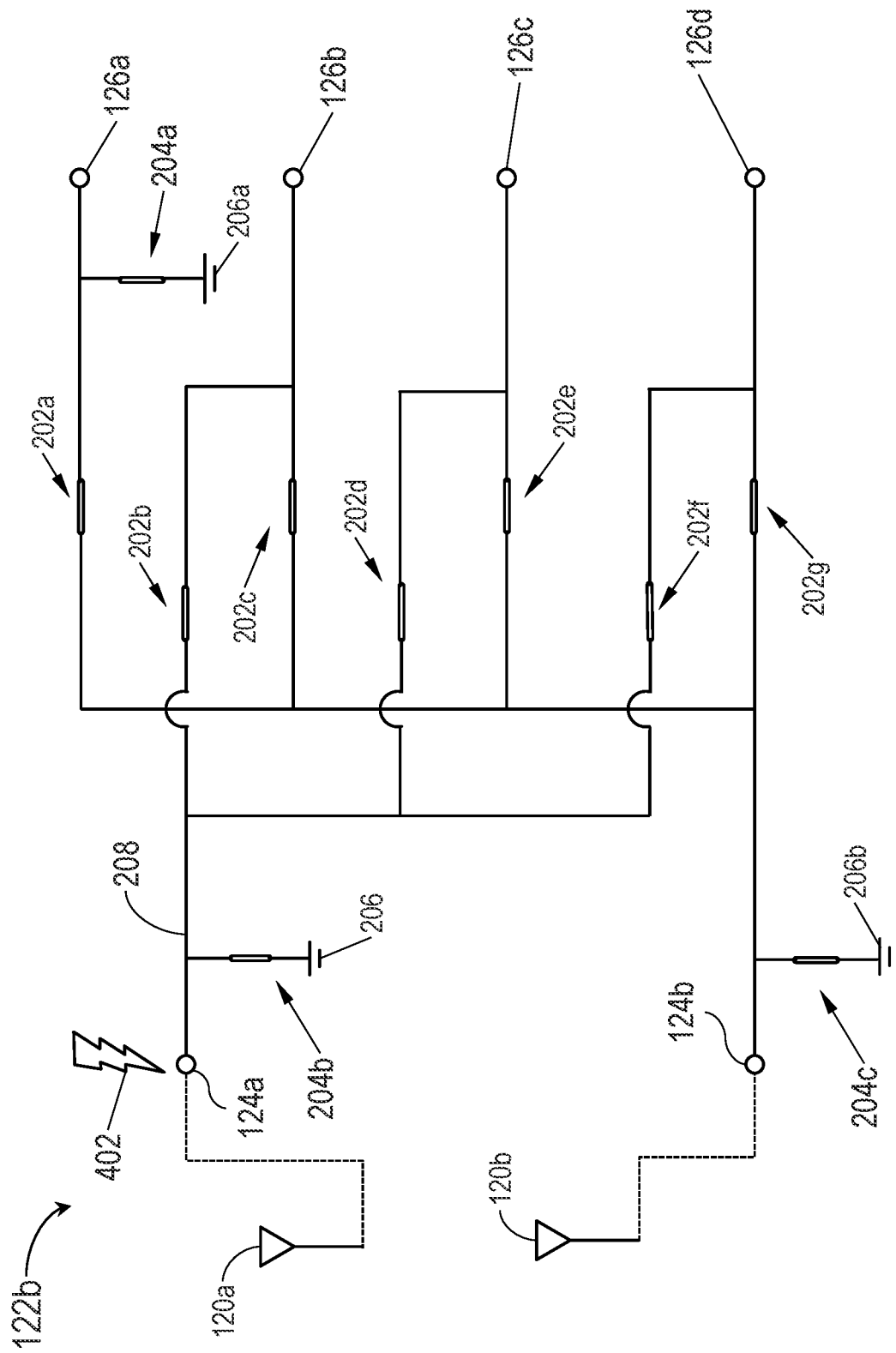
FIG. 4 is a block diagram illustrating an antenna switch of the RF front-end module of FIG. 1 configured in an isolation mode according to example embodiments of this disclosure.

Referring to FIG. 2A, an RF multiplexing switch (122, FIG. 1) is shown implemented as a band select switch 122a (BSW). In embodiments, the RF multiplexing switch may be implemented as a BSW 122a, or as an ASW (122b, FIG. 1) as shown by FIG. 4 below. In embodiments, the RF multiplexing switch 122 may include a set of RF input ports 124a, 124b (e.g., RF inputs), a set of RF output ports 126a-126d (e.g., RF outputs, band output ports), a set of series switches 202a-202g, a set of shunt switches 204a-204c, and RF grounds 206. For example, the RF input ports 124a-124b and RF output ports 126a-126d may be connected by RF signal paths 208 through the RF multiplexing switch 122; in some embodiments, however, not every RF input port will be connected to every RF output port. For example, as shown by FIG. 2A, an RF signal path 208 may exist between the RF input port 124b and each RF output port 126a-126d, but no RF signal path may exist between the RF input port 124a and the RF output port 126a.

In embodiments, each RF signal path 208 may, under certain conditions, conduct an RF signal or signals (e.g., via wires or any other appropriate conductive medium) between an RF input port 124a-124b and an RF output port 126a-126d. For example, as shown below by FIG. 2B, if the series switch 202b in the RF signal path 208 between the RF input port 124a and the RF input port 126b is in a closed state, the RF signal path may be a conducting signal path via which RF signals may transit between the RF input port 124a and the RF output port 126b. Similarly, if the series switch 202b is in an open state, the RF signal path 208 may be a non-conducting signal path.

In embodiments, the RF multiplexing switch 122 may be implemented with various numbers of RF input ports (124, FIG. 1), RF output ports (126, FIG. 1), series switches 202a-202g, and shunt switches 204a-204c in addition to the two RF input ports, four RF output ports, seven series switches, and three shunt switches shown by FIG. 2A. For example, the RF multiplexing switch 122 may alternatively or additionally be implemented with three RF input ports 124a-124b and seven RF output ports 126a-126d. By way of another non-limiting example, for each RF multiplexing switch 122 implemented with M RF input ports 124 and N RF output ports 126 (wherein M and N are integers), a set of M+X shunt switches 204a-204c may be included (wherein X is an integer less than N).

In embodiments, series switches 202a-202g may refer to any switch on an RF signal path 208 capable of creating a conducting signal path between an RF input port 124a-124b and an RF output port 126a-126d by closing (e.g., activating, turning on). For example, each series switch 202a-202g may be disposed at or adjacent to a particular RF output port 126a-126d and capable of creating a conducting signal path to that RF output port, e.g., series switch 202a at RF output port 126a; paired series switches 202b, 202c (e.g., one series switch 202b, 202c connected to each RF input port 124a, 124b) at RF output port 126b; paired series switches 202d, 202e at RF output port 126c; and paired series switches 202f, 202g at RF output port 126d. In embodiments, wherein the RF multiplexing switch 122 includes three (or more) RF input ports 124a-124b, one or more RF output ports 126b-126d may include three (or more) series switches 202a-202g connected in parallel. It may be noted that the term "series switch" may imply a series connection in the sense that a series switch 202a may be disposed on an RF signal path 208 between an RF input port 124a and an RF output port 126b, wherein the RF signal path 208 is the only RF signal path between the RF input port and the RF output port, and the state of the series switch may determine whether the RF signal path is a conducting signal path (e.g., when the series switch is in a closed state) or a non-conducting signal path (e.g., when the series switch is in an open state).

In embodiments, shunt switches 204a-204c may refer to any switch on an RF signal path 208 capable (e.g., by closing) of shunting current flow through the RF signal path, or creating a low impedance/low resistance signal path to an RF ground 206 via which the electric potential of any RF input port 124a-124b and RF output port 126a-126d on the associated RF signal path may be pulled down to ground level. For example, the set of shunt switches may include a shunt switch 204a at or adjacent to the RF output port 126a and shunt switches 204b, 204c respectively at or adjacent to each RF input port 124a, 124b.

In embodiments, the set of M+X shunt switches 204a-204c may improve upon conventional approaches as described above by removing redundant dedicated shunt switches 210, e.g., minimizing the number of necessary shunt switches and reducing die size overall without compromising the operation of the RF multiplexing switch 122. Similarly, the set of shunt switches 204a-204c may operate as a set of common, shared shunt switches (e.g., as opposed to conventional dedicated shunt switches 210 at or adjacent to each individual RF output port 126b-126d), reducing the amount of switch drivers and/or level shifters within the circuitry of the RF multiplexing switch 122. For example, the set of M+X shunt switches 204a-204c (wherein 1≤X<N) may include as few as M+1 shunt switches (as shown by FIG. 2A), and in any event fewer than M+N shunt switches (consistent with a dedicated shunt switch 204b-204c at, or adjacent to, each RF input port 124a-124b and a dedicated shunt switch 204a, 210 at, or adjacent to, each RF output port 126a-126d).

Figure 2B:
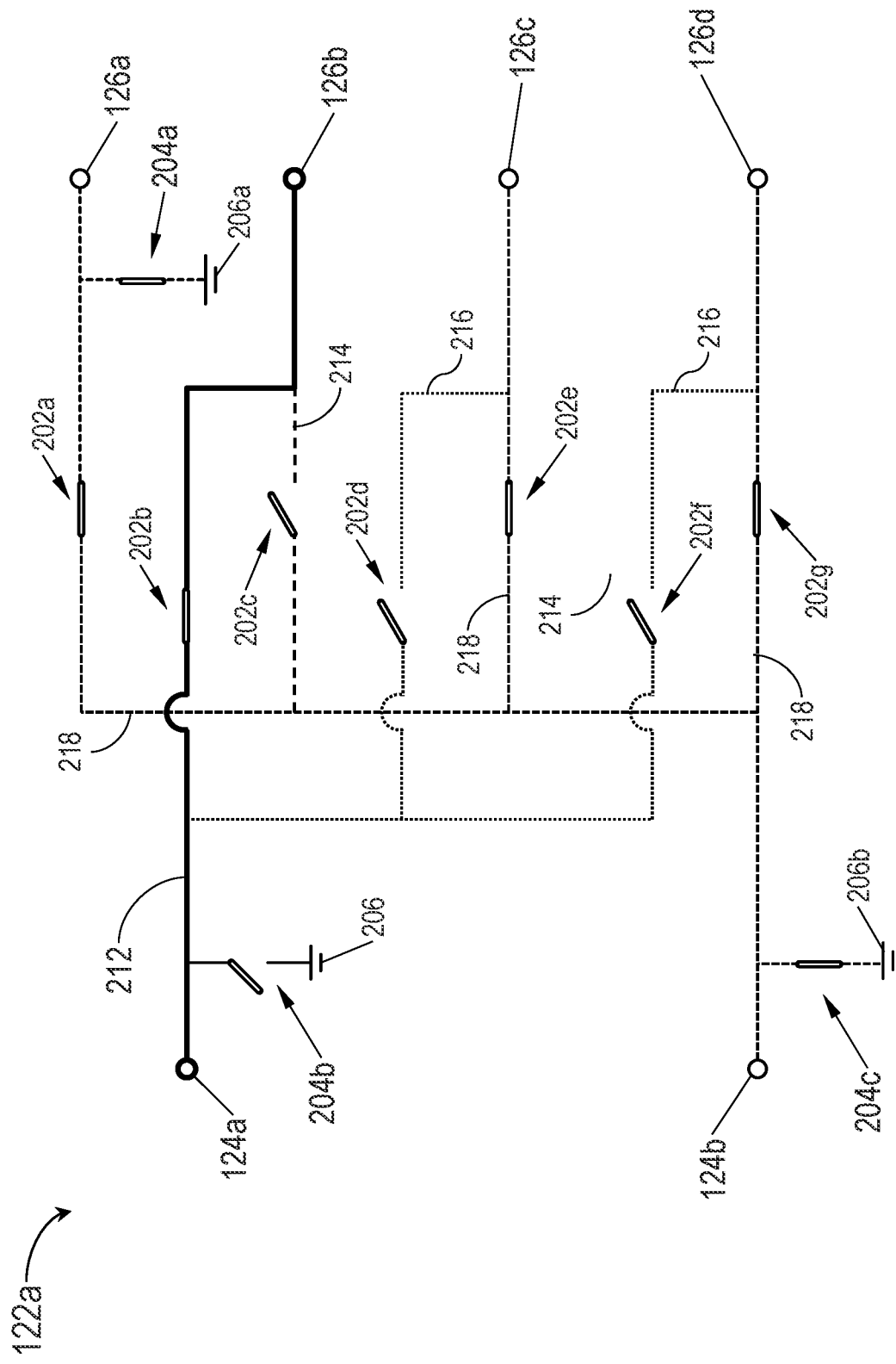
FIG. 2B is a block diagram illustrating a switching operation of the RF multiplexing switch of FIG. 2A.

Referring now to FIG. 2B, the band select switch 122a is shown.

In embodiments, the set of series switches 202a-202g and the set of shared common shunt switches 204a-204c may operate in common to handle any pull-down requests in any pass-band mode when a conducting signal path 212 is created between an RF input port 124a and an RF output port 126b (e.g., providing a low impedance, low resistance path to RF ground 206 for each RF input port 126b and RF output port 126a, 126c, 126d not on the conducting signal path). For example, the series switch 202b may close to create the conducting signal path 212 (e.g., based on the RF signal path (208, FIG. 2A)) between the RF input port 124a and RF output port 126b, via which inbound or outbound RF signals (e.g., depending on whether the RF multiplexing switch 122 is implemented as a band select switch (122a, FIG. 1) or an antenna switch (122b, FIG. 2) as described below) may transit through the RF multiplexing switch. Further, the other series switch/es 202c at or adjacent to the RF output port 126b may open to disconnect (214) the RF input port 124a from the RF output port 126b (e.g., render the RF signal path 214 between the RF input port 124a and the RF output port 126b a non-conducting signal path). Similarly, the series switches 202d, 202f connected to the RF input port 124a on the conducting signal path 212 and adjacent to the other RF output ports 126c, 126d (e.g., connected to the RF input port 124a via RF signal paths 216) may open to disconnect the RF input port 124a from, and block signal leakage through, the RF output ports 126c, 126d. Further, the series switches 202a, 202e, 202g connected to the RF input port 124b not on the conducting signal path 212, as well as the common shunt switches 204a, 204c may close to provide low impedance paths (218) to RF ground 206a, 206b via which the electric potential of the RF input ports 124b and RF output ports 126a, 126c, 126d not on the conducting signal path 212 may be pulled down to ground level (e.g., while the shunt switch 204b on the conducting signal path remains open to prevent leakage of RF signals in transit via the conducting signal path through the RF ground 206).

In embodiments, reconfiguration of the series switches 202a-202g and common shunt switches 204a-204c may reduce the amount of corresponding switch drivers and/or level shifters within the circuitry of the RF multiplexing switch 122, minimizing switch die size (e.g., silicon-on-insulator (SOI) or any other appropriate printed circuit board (PCB) implementations) and cost, as noted above. Further, in embodiments wider bandwidth may be achieved (and, e.g., higher loaded quality factor ("loaded Q", referring to capacitor efficiency) of matching network in wideband applications) by reducing the total loaded off-capacitance $C_{off}$ for any conducting signal path 212. For example, referring back to the example shown above by FIGS. 2A and 2B, assuming consistent $C_{off}$ among all series switches 202a-202g and shunt switches 204a-204c alike (e.g., $C_{off(se)}=C_{off(sh)}$), the total loading $C_{off}$ for the RF input port 124a on the conducting signal path may be reduced from $2C_{off(se)}+2C_{off(sh)}$ to $2C_{off(se)}+C_{off(sh)}$.

Figure 3:
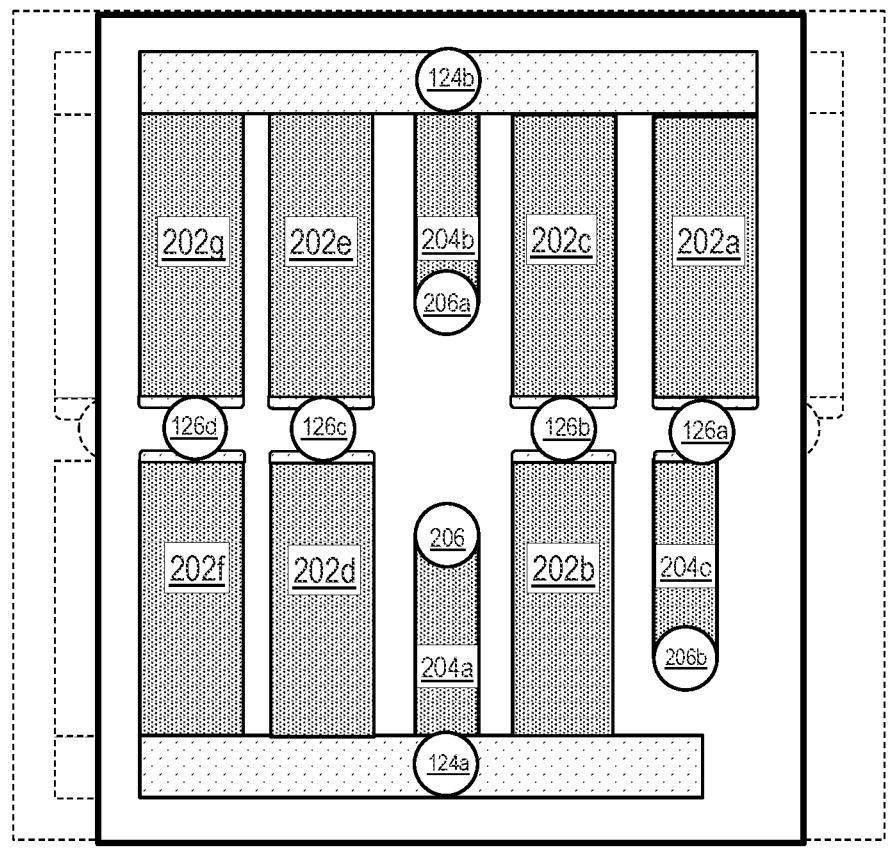
FIG. 3 is a diagrammatic illustration of a layout implementation of the RF multiplexing switch of FIG. 2A.
Figure 3:
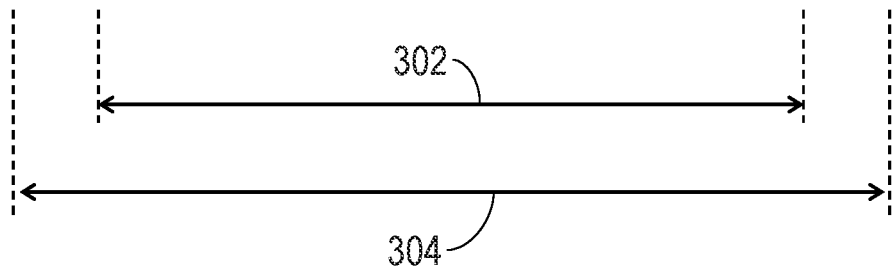

Referring now to FIG. 3, the RF multiplexing switch 122 is shown.

In embodiments, by removing redundant shunt switches (210, FIG. 2A), the RF multiplexing switch 122 incorporating RF input ports 124a-124b, RF output ports 126a-126d, series switches 202a-202g, and shunt switches 204a-204c may be significantly reduced in width (302) (and therefore in total layout area) relative to a conventional RF switch (width 304) incorporating series/shunt switch pairs.

Referring now to FIG. 4, the antenna switch 122b (ASW) may be implemented and may function similarly to the RF multiplexing switch 122 of FIGS. 2A and 2B (implemented as a band select switch (BSW)), except that the ASW 122b may be implemented as an antenna switch (ASW) rather than as a band select switch (BSW) as described above with respect to the RF multiplexing switch 122 shown by FIG. 2. For example, the RF output ports 126a-126d may similarly output to the RF filters (112-118, FIG. 1) whereas with respect to the ASW 122b each RF input port 124a-124b may connect the ASW to one or more antennas 120a, 120b.

In embodiments, the ASW 122b may be configured for isolation mode to alleviate the intrinsic reverse harmonics generally associated with ASW implementations of conventional RF multiplexing switches. For example, a conventional ASW incorporating series/shunt switch pairs (e.g., including dedicated shunt switches (210, FIG. 2A) as described above) may implement an isolation mode by turning all series switches off (e.g., open, deactivated) while turning all shunt switches on (e.g., closed). However, as discussed above this may result in signal leakage power (402) from other active RF modules being picked up by the input port 124a, resulting in a voltage swing that induces reverse harmonics transmitted to the antenna 120a as spurious emissions (of Tx signals) or blocker power (of Rx signals). Conventional RF switches may attempt to solve this problem by increasing the size of dedicated shunt switches, but this requires increased die size and may reduce available bandwidth and lead to degraded intrinsic loss.

In embodiments, the ASW 122b may alleviate the reverse-harmonic problem by reducing pull-down on-resistance $R_{on}$ to the RF ground 206, 206a-206b. For example, the ASW 122b (e.g., with redundant shunt switches (210, FIG. 2A) removed, as with the BSW 122a shown by FIGS. 2A and 2B) may be configured for isolation mode by turning on (e.g., closing) all series switches 202a-202g and shunt switches 204a-204c. In embodiments, the reconfigured isolation mode shown by the ASW 122b may result in a stronger pull down of electric potential of RF input ports 124a-124b and RF output ports 126a-126d to ground level, and significantly reduced $R_{on}$ relative to conventional ASW approaches.

Figure 5:
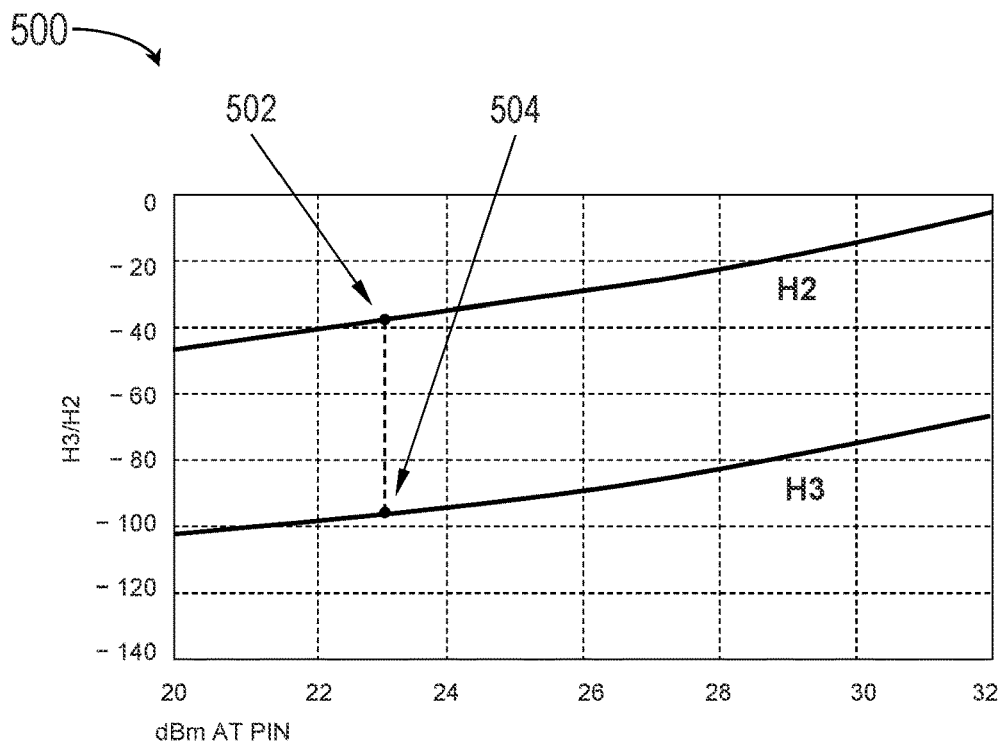
FIG. 5 is a graphical illustration of reverse harmonic performance of the antenna switch of FIG. 4.
Figure 5:
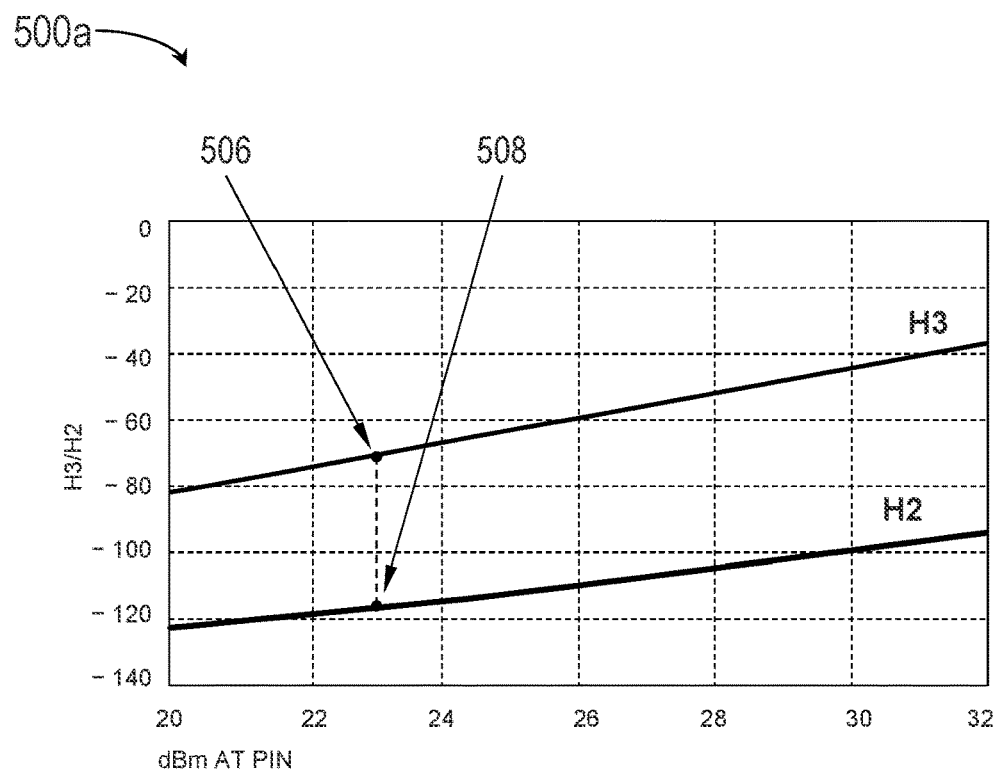

Referring now to FIG. 5, the graph 500 shows an example of reverse harmonic performance of a conventional ASW as discussed above, and the graph 500a shows a corresponding example of reverse harmonic performance of the ASW 122b shown by FIG. 4.

For example, referring to the graph 500, with a 3.7 GHz, 23 dBm RF signal applied at an RF input port (e.g., ANT1 pin), the conventional ASW may show a reversed H2 of −95.81 dBm (502) and a reversed H3 of −37.45 dBm (504). In embodiments, referring to the graph 500a, the reconfigured ASW 122b may, given the same 3.7 GHz, 23 dBm RF signal applied at the RF input port (124a, FIG. 4), reduce reversed H2 and H3 to −117 dBm (506) and −69.29 dBm (508) respectively.

Embodiments of the inventive concepts disclosed above may benefit RF front-end module and mobile communication device design and implementation by reducing switch die size (and therefore RF front end module size) and improving overall RF performance. In particular, embodiments of RF multiplexing switching circuits as disclosed herein may improve reversed harmonic performance in ASW implementations.

Figure 6:
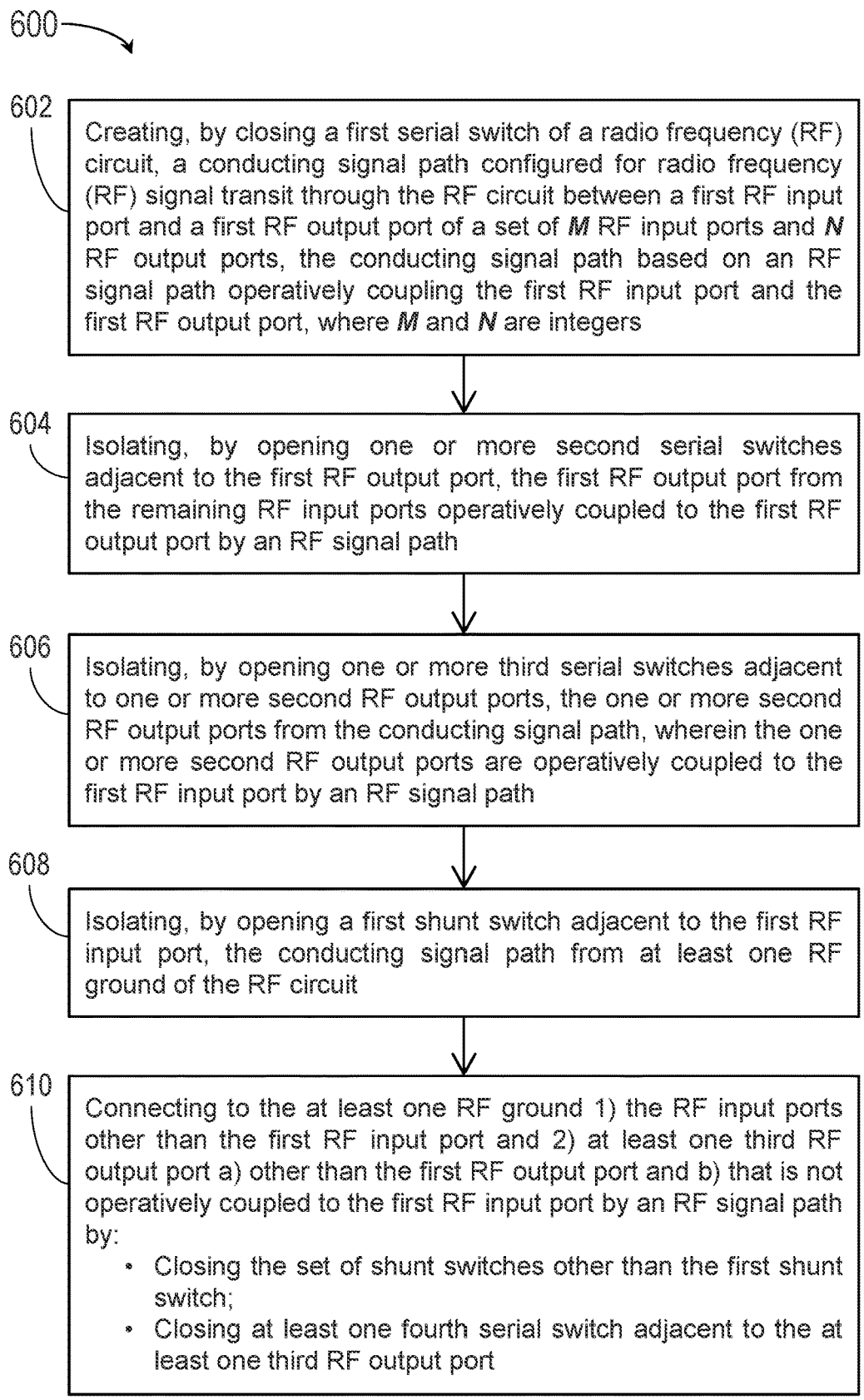
FIG. 6 is a process flow diagram illustrating a method for multiplexing RF switch operations according to example embodiments of this disclosure.

Referring now to FIG. 6, the method 600 may be implemented by the RF multiplexing switch 122 (e.g., when implemented as a BSW (122a, FIG. 2B)) and may include the following steps.

At a step 602, a series switch of an RF switching circuit closes to create a conducting signal path based on an RF signal path between a first RF input port and a first RF output port of the circuit (e.g., of a set of M RF input ports and N RF output ports, wherein M, N are integers), the conducting signal path allowing transit of RF signals between the first RF input and output ports and through the circuit.

At a step 604, series switches at or adjacent to the first RF output port (e.g., on the conducting signal path) open to isolate the first RF output port from the other RF input ports (e.g., other than the first RF input port) to which the first RF output port is operatively coupled by an RF signal path (e.g., creating a non-conducting signal path based on each of these latter RF signal paths).

At a step 606, series switches at or adjacent to second RF output ports operatively coupled to the first RF input port on the conducting signal path (e.g., each second RF output ports also operatively coupled to the first RF input port by an RF signal path) open to isolate the second RF output ports from the conducting signal path.

At a step 608, a shunt switch (e.g., of a set of M+X shunt switches, wherein X is an integer less than N) at or adjacent to the first RF input port opens to isolate the conducting signal path from the RF ground points of the RF switching circuit.

At a step 610, the remaining shunt switches of the RF switching circuit, and the series switches adjacent to the third RF output ports (e.g., each RF output port other than the first RF output port and not operatively coupled to the first RF input port by an RF signal path), close to create low-impedance paths to the RF ground points of the RF switching circuit from 1) each RF input port other than the first RF input port and 2) each third RF output port.

We claim:

1. A circuit comprising:
   a set of M radio frequency (RF) input ports, wherein M is an integer;
   a set of N RF output ports, wherein N is an integer, the M RF input ports operatively coupled to the N RF output ports by a set of RF signal paths, each RF output port operatively coupled to one or more RF filters;
   a set of series switches, each series switch configured to create a conducting signal path based on an RF signal path operatively coupling an RF input port and an RF output port;
   a set of M+X shunt switches, wherein X is an integer less than N, the set of shunt switches being connected to at least one RF ground for each RF input port and each RF output port not associated with the conducting signal path;
   wherein the set of series switches includes a first series switch adjacent to a first RF output port and configured to create, by closing, a conducting signal path based on an RF signal path operatively coupling a first RF input port and the first RF output port.

2. The circuit of claim 1, wherein the set of M RF input ports includes:
   a first RF input port operatively coupled to each of the N RF output ports by an RF signal path; and
   M−1 RF input ports operatively coupled to each of N−1 RF output ports by an RF signal path and not operatively coupled to a first RF output port by an RF signal path.

3. The circuit of claim 2, wherein the set of M+X shunt switches includes:
an output shunt switch adjacent to the first RF output port; and
M input shunt switches, each input shunt switch adjacent to an RF input port of the M RF input ports.

4. The circuit of claim 1, wherein:
the circuit is a band select switching circuit;
wherein each RF filter is associated with at least one RF frequency band; and
wherein each RF input port is operatively coupled to at least one RF amplifier.

5. The circuit of claim 1, wherein:
the circuit is an antenna switching circuit; and
wherein each RF input port is operatively coupled to at least one antenna.

6. The circuit of claim 5, wherein:
the circuit is configurable in an isolation mode by closing each series switch and each shunt switch.

7. The circuit of claim 1, wherein the set of series switches includes:
one or more second series switches adjacent to the first RF output port, the one or more second series switches configured to isolate, by opening, the first RF output port from the remaining RF input ports to which the first RF output port is operatively coupled by an RF signal path;
one or more third series switches, each third series switch adjacent to an RF output port 1) other than the first RF output port and 2) that is operatively coupled to the first RF input port by an RF signal path, each third series switch configured to isolate, by opening, the adjacent RF output port from the conducting signal path; and
at least one fourth series switch adjacent to an RF output port 1) other than the first RF output port and 2) that is not operatively coupled to the first RF input port by an RF signal path, each fourth series switch configured to connect, by closing, the adjacent RF output port and the at least one RF ground.

8. The circuit of claim 7, wherein the set of M+X shunt switches includes:
a first shunt switch adjacent to the first RF input port, the first shunt switch configured to isolate, by opening, the conducting signal path from the at least one RF ground; and
a set of one or more shunt switches configured to close in conjunction with the at least one fourth series switch.

9. The circuit of claim 1, wherein the circuit is an RF front-end circuit embodied in a mobile communications device.

10. The circuit of claim 1, wherein:
the set of M RF input ports is a set of two (2) RF input ports;
the set of N RF output ports is a set of four (4) RF output ports; and
the set of series switches is a set of seven (7) series switches.

11. A radio frequency (RF) front end, comprising:
at least one transceiver configured to transmit and receive one or more radio frequency (RF) signals;
at least one antenna;
one or more RF filters, each RF filter configured for filtering of the one or more RF signals and associated with an RF frequency band; and
at least one RF front-end circuit connecting at least one transceiver or the at least one antenna to the one or more RF filters, the at least one RF front-end circuit comprising:
a set of M radio frequency (RF) input ports, wherein M is an integer;
a set of N RF output ports, wherein N is an integer, the M RF input ports operatively coupled to the N RF output ports by a set of RF signal paths, each RF output port operatively coupled to one or more RF filters;
a set of series switches, each series switch configured to create a conducting signal path based on an RF signal path operatively coupling an RF input port and an RF output port;
a set of M+X shunt switches, wherein X is an integer less than N, the set of shunt switches being connected to at least one RF ground for each RF input port and each RF output port not associated with the conducting signal path;
wherein the set of series switches includes a first series switch adjacent to a first RF output port and configured to create, by closing, a conducting signal path based on an RF signal path operatively coupling a first RF input port and the first RF output port.

12. The RF front end of claim 11, wherein the set of M RF input ports includes:
a first RF input port operatively coupled to each of the N RF output ports by an RF signal path; and
M−1 RF input ports operatively coupled to each of N−1 RF output ports by an RF signal path and not operatively coupled to a first RF output port by an RF signal path.

13. The RF front end of claim 12, wherein the set of M+X shunt switches includes:
an output shunt switch adjacent to the first RF output port; and
M input shunt switches, each input shunt switch adjacent to an RF input port of the M RF input ports.

14. The RF front end of claim 11, further comprising:
one or more RF amplifiers including at least one of a power amplifier (PA) or a low noise amplifier (LNA);
wherein;
the circuit is a band select switching circuit; and
each RF input port is operatively coupled to at least one RF amplifier of the one or more RF amplifiers.

15. The RF front end of claim 11, wherein:
the circuit is an antenna switching circuit; and
wherein each RF input port is operatively coupled to at least one antenna of the one or more antennas.

16. The RF front end of claim 15, wherein the circuit is configurable in an isolation mode by closing each series switch and each shunt switch.

17. The RF front end of claim 11, wherein the set of series switches includes:
- one or more second series switches adjacent to the first RF output port, the one or more second series switches configured to isolate, by opening, the first RF output port from the remaining RF input ports to which the first RF output port is operatively coupled by an RF signal path;
- one or more third series switches, each third series switch adjacent to an RF output port 1) other than the first RF output port and 2) that is operatively coupled to the first RF input port by an RF signal path, each third series switch configured to isolate, by opening, the adjacent RF output port from the conducting signal path; and
- at least one fourth series switch adjacent to an RF output port 1) other than the first RF output port and 2) that is not operatively coupled to the first RF input port by an RF signal path, each fourth series switch configured to connect, by closing, the adjacent RF output port and the at least one RF ground.

18. The RF front end of claim 17, wherein the set of M+X shunt switches includes:
- a first shunt switch adjacent to the first RF input port, the first shunt switch configured to isolate, by opening, the conducting signal path from the at least one RF ground; and
- a set of one or more shunt switches configured to close in conjunction with the at least one fourth series switch.

19. The RF front end of claim 11, wherein:
- the set of M RF input ports is a set of two (2) RF input ports;
- the set of N RF output ports is a set of four (4) RF output ports; and
- the set of series switches is a set of seven (7) series switches.

20. A method, comprising:
- creating, by closing a first series switch of a radio frequency (RF) circuit, a conducting signal path configured for radio frequency (RF) signal transit through the RF circuit between a first RF input port and a first RF output port of a set of M RF input ports and N RF output ports, the conducting signal path based on an RF signal path operatively coupling the first RF input port and the first RF output port, where M and N are integers;
- isolating, by opening one or more second series switches adjacent to the first RF output port, the first RF output port from the remaining RF input ports operatively coupled to the first RF output port by an RF signal path;
- isolating, by opening one or more third series switches adjacent to one or more second RF output ports, the one or more second RF output ports from the conducting signal path, wherein the one or more second RF output ports are operatively coupled to the first RF input port by an RF signal path;
- isolating, by opening a first shunt switch adjacent to the first RF input port, the conducting signal path from at least one RF ground of the RF circuit; and
- connecting to the at least one RF ground 1) the RF input ports other than the first RF input port and 2) at least one third RF output port a) other than the first RF output port and b) that is not operatively coupled to the first RF input port by an RF signal path by:
  - closing the set of shunt switches other than the first shunt switch; and
  - closing at least one fourth series switch adjacent to the at least one third RF output port.

* * * * *